United States Patent
Li

(10) Patent No.: US 8,913,072 B2
(45) Date of Patent: Dec. 16, 2014

(54) METHOD AND TERMINAL FOR IMPLEMENTING DISPLAY CACHE

(71) Applicant: Tencent Technology (Shenzhen) Company Limited, Shenzhen, Guangdong (CN)

(72) Inventor: Xuefeng Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/072,084

(22) Filed: Nov. 5, 2013

(65) Prior Publication Data

US 2014/0055477 A1 Feb. 27, 2014

Related U.S. Application Data

(63) Continuation of application No. PCT/CN2012/077911, filed on Jun. 29, 2012.

(30) Foreign Application Priority Data

Aug. 25, 2011 (CN) ............................ 2011 1 0245501
Sep. 7, 2011 (CN) ............................ 2011 1 0264122

(51) Int. Cl.
*G09G 5/36* (2006.01)
*G06T 1/60* (2006.01)
*G09G 5/00* (2006.01)

(52) U.S. Cl.
CPC .. *G06T 1/60* (2013.01); *G09G 5/00* (2013.01); *G09G 2360/121* (2013.01)
USPC ........................................................ 345/557

(58) Field of Classification Search
CPC ............................................... G09G 2360/121
USPC ........................................................ 345/557
See application file for complete search history.

(56) References Cited

U.S. PATENT DOCUMENTS 5,917,507 A * 6/1999 Sakurai ........................ 345/551
2002/0091738 A1 7/2002 Rohrabaugh et al.
(Continued)

FOREIGN PATENT DOCUMENTS

CN 1588303 A 3/2005

OTHER PUBLICATIONS

International Search Report in international application No. PCT/CN2012/077911, mailed on Oct. 4, 2012. (3 pages—see entire document).

(Continued)

*Primary Examiner* — Maurice L McDowell, Jr.
*Assistant Examiner* — Kyle Zhai
(74) *Attorney, Agent, or Firm* — Oppedahl Patent Law Firm LLC

(57) ABSTRACT

The embodiment of the disclosure discloses a method and terminal for implementing display cache, which comprise storing, in memory, texts to be displayed as text component objects; creating a cache image object with a same size as a stored text component when displaying the text component on a screen. In the solution of display cache according to the embodiment of the disclosure, cache images are only created for text regions. Memory that would be occupied by creating cache images for non-text regions, can be saved, which offers the cache images a smaller area and a less memory occupation. By means of the solution according to the embodiment of the disclosure, a lot of running memory can be saved for programs and memory requirements of a lot of product characteristics can be met, without affecting fast display.

18 Claims, 2 Drawing Sheets

(56) References Cited

U.S. PATENT DOCUMENTS

| | | |
|---|---|---|
| 2003/0142126 A1* | 7/2003 | Estrada et al. ............... 345/738 |
| 2005/0131887 A1 | 6/2005 | Rohrabaugh et al. |
| 2005/0132286 A1 | 6/2005 | Rohrabaugh et al. |
| 2006/0044315 A1* | 3/2006 | Yamamoto ................. 345/543 |
| 2007/0198916 A1 | 8/2007 | Rohrabaugh et al. |
| 2007/0198917 A1 | 8/2007 | Rohrabaugh et al. |
| 2007/0288841 A1 | 12/2007 | Rohrabaugh et al. |
| 2007/0288855 A1 | 12/2007 | Rohrabaugh et al. |
| 2008/0018658 A1 | 1/2008 | Bruno et al. |
| 2008/0028335 A1 | 1/2008 | Rohrabaugh et al. |
| 2008/0320396 A1* | 12/2008 | Mizrachi et al. ............. 715/744 |
| 2009/0119580 A1 | 5/2009 | Rohrabaugh et al. |
| 2011/0231746 A1 | 9/2011 | Rohrabaugh et al. |
| 2011/0231782 A1 | 9/2011 | Rohrabaugh et al. |
| 2012/0110438 A1* | 5/2012 | Peraza et al. ................ 715/243 |

OTHER PUBLICATIONS

English Translation of the Written Opinion of the International Search Authority in international application No. PCT/CN2012/077911, mailed on Oct. 4, 2012. (6 pages—see entire document).

* cited by examiner

METHOD AND TERMINAL FOR IMPLEMENTING DISPLAY CACHE

CROSS REFERENCE TO RELATED APPLICATIONS

This is a continuation application of International Patent Application No.: PCT/CN2012/077911, filed on Jun. 29, 2012, which claims priority to Chinese Patent Application No.: 201110245501.2 filed on Aug. 25, 2011, the disclosure of which is incorporated by reference herein in its entirety.

TECHNICAL FIELD

This disclosure generally relates to mobile terminal information browsing technologies, and more particularly, to a method and terminal for implementing display cache.

BACKGROUND

As known to all, for mobile terminals like mobile phones, rendering texts is less efficient than rendering images. Application developers thus usually incline to render texts on an image first and then render the image on a screen, to enhance the speed of displays and provide a smooth browsing experience, FIG. 1 shows a complete image used in screen display cache, which comprises both text and image information.

Conventional screen display cache often requires creating a cache image with a same (or even larger) size of a screen. Creation of cache images certainly occupies memory. In mobile phones with low screen rendering efficiency, as NOKIA S40, Sony Ericsson, domestic mobile phones and the like with JAVA platform, the existing method for implementing screen display cache needs a lot of memory. Taking a 24-bit color mobile phone screen with a size of 240×320 as an example, the occupied memory is about over 300K. Considering KJAVA mobile phones have generally a very limited running memory measured in units of K, 2M of memory is already a relatively high configuration. But in order to realize fast display, an additional running memory of 300K has to be occupied. Consequently, memory can be reserved for programs, becomes smaller definitely and developments are limited. As a result, no more product requirements can be added into programs. It is very unfavorable for the development of mobile terminals.

SUMMARY

In view of the above, embodiments of the disclosure aim to provide a method and terminal for implementing display cache, which can reduce the size of cache images and save memory.

To solve these technical problems above, the embodiments of the disclosure provide:

A method for implementing display cache, comprising:
storing, in memory, texts to be displayed as text component objects; and
creating a cache image object with a same size as a stored text component when displaying the text component on a screen.

When a user performs a rolling operation on the screen, for a text component which is kept being displayed on the screen, the method further comprises: rendering directly, on the screen, the cache image corresponding to the text component.

When a user performs a rolling operation on the screen, for a text component which was moved out of the screen, the method further comprises: deleting immediately the cache image corresponding to the text component.

The text components stored as text component objects, each is defined with attributes of its size and cache image.

The attributes comprise: width and height representing the size as well as cache image.

Creating a cache image object with a same size as a text component comprises: creating a blank image with a same size as a text component, and rendering texts on the blank image to obtain a cache image object.

A terminal for implementing display cache, comprising a screen, and further comprising a first processing module and a creating module, wherein
the first processing module is configured to store, in memory, texts to be displayed as text component objects; and
the creating module is configured to create a cache image object with a same size as a stored text component when displaying the text component on the screen.

The terminal further comprises a second processing module, configured to render directly, on the screen, the cache image corresponding to a text component which is kept being displayed on the screen, when a user performs a rolling operation on the screen.

The second processing module is further configured to delete the cache image corresponding to a text component which was moved out of the screen, when the user performs the rolling operation on the screen.

In the above solution, the text components stored as text component objects, each is defined with attributes of its size and cache image.

In the above solution, the attributes comprise: width and height representing size and cache image.

It can be seen, from the technical solution provided by the embodiment of the disclosure above, that texts to be displayed are stored in memory as text component objects, and when displaying a stored text component on a screen, a cache image object with a same size as the text component is created. In the method for implementing display cache according to the embodiment of the disclosure, cache images are only created for text regions. Memory that would be occupied by creating cache images for non-text regions, can be saved, which offers the cache images a smaller area and a less memory occupation. By means of the method according to the embodiment of the disclosure, a lot of running memory can be saved for programs and memory requirements of a lot of product characteristics can be met, without affecting fast display.

DETAILED DESCRIPTION

Figure 1:
FIG. 1 is a schematic diagram of an image used in an existing screen display cache.
Figure 2:
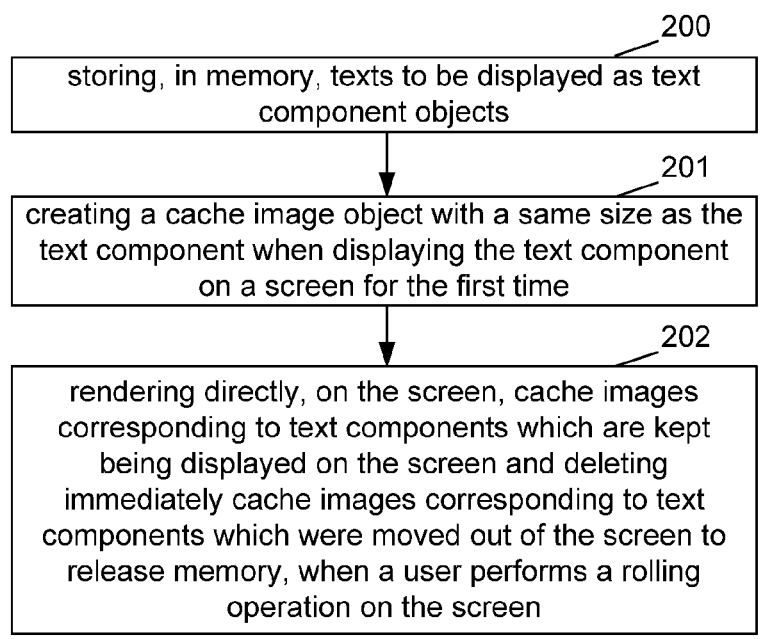
FIG. 2 is a flow schematic diagram of a method for implementing display cache according to an embodiment of the disclosure.

FIG. 2 is a flow schematic diagram of a method for implementing display cache according to an embodiment of the disclosure. As shown in FIG. 2, the method comprises:

Step 200: storing, in memory, texts to be displayed as text component objects.

Figure 3:
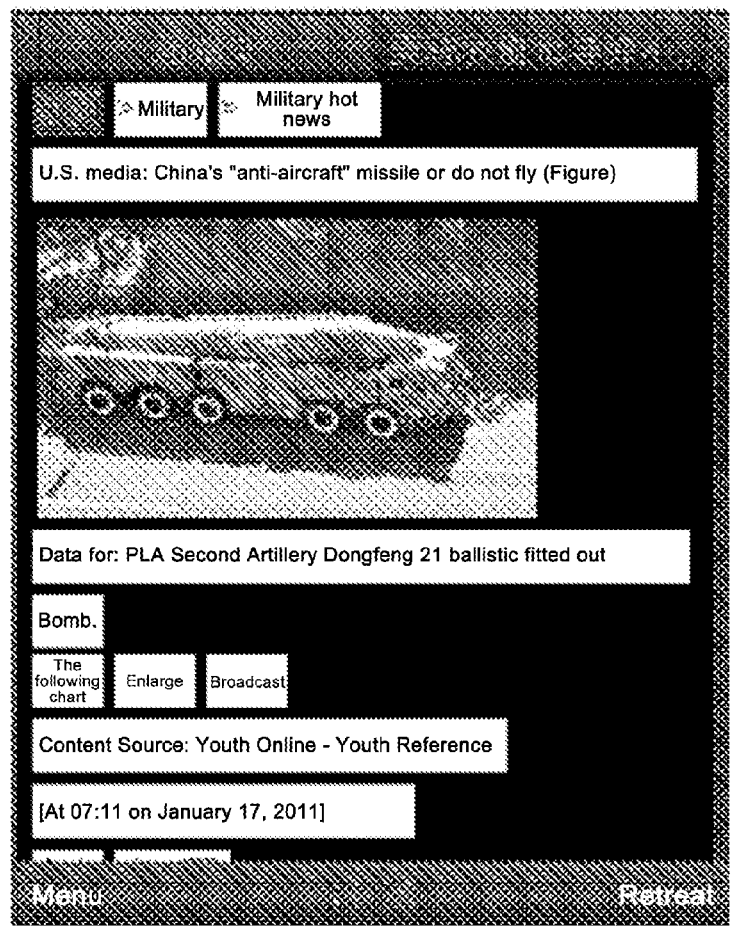
FIG. 3 is a schematic diagram of an image used in display cache according to an embodiment of the disclosure.

The texts to be displayed, as shown in the reversed regions of FIG. 3, can be determined by analyzing Hypertext Markup Language (HTML) of a webpage.

In this step, the text components each is defined with attributes of its size (including width and height), cache image and the like.

As shown in FIG. 3, in the method according to the embodiment of the disclosure, for information needs to be displayed on a screen, cache images are only created for reversed text regions.

Step 201: creating a cache image object with a same size as a stored text component when displaying the text component on a screen for the first time, and storing the created cache image object as one attribute of the text component.

When a stored text component needs to be displayed, a blank image with a same size as the text component may be created and corresponding texts may be rendered on the blank image to obtain a cache image object.

In the method according to the embodiment of the disclosure, a plurality of smaller cache images are displayed on where corresponding texts are supposed to be displayed, rather than just using one large-size complete cache image, as in the prior art.

In the method for implementing display cache according to the embodiment of the disclosure, cache images are only created for text regions. Memory that would be occupied by creating cache images for non-text regions, can be saved, which offers the cache images a smaller area and a less memory occupation. In an example, for the image including webpage contents shown in FIG. 3, as a complete image to be displayed on a screen, a corresponding complete cache image would has to be created, according to the existing technologies. While in the method according to the embodiment of the disclosure, there is no longer need to create such a complete cache image for the complete image but rather to create cache images only for the text regions, causing a reduction in the overall area of cache images and a less memory occupation.

The method according to the embodiment of the disclosure can further comprise:

Step 202: rendering directly, on the screen, cache images corresponding to text components which are kept being displayed on the screen and deleting immediately cache images corresponding to text components which were moved out of the screen to release memory, when a user performs a rolling operation on the screen.

In this step, determining whether a text component is displayed on the screen or was moved out of the screen belongs to conventional technical means of those skilled in the art, and is not repeated here.

By means of the method according to the embodiment of the disclosure, a lot of running memory can be saved for programs and memory requirements of a lot of product characteristics can be met, without affecting fast display. Taking a 24-bit color mobile phone screen of 240×320 as an example, now, memory occupation of display cache can be reduced from 300K to 100-150K. In the method according to the embodiment of the disclosure, creating cache images for only 50-60 percent (or even less) of the screen is sufficient to implement display cache, which reduces memory occupation.

Figure 4:
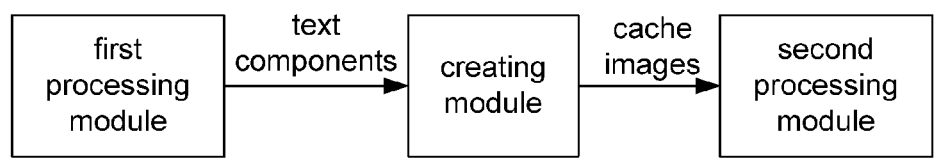
FIG. 4 shows a structural schematic diagram of a structure of a terminal for implementing display cache according to an embodiment of the disclosure.

Based on the method according to the embodiment of the disclosure, it also provides a terminal for implementing display cache and comprising a screen. As shown in FIG. 4, the terminal at least further comprises a first processing module and a creating module, wherein, the first processing module is configured to store, in memory, texts to be displayed as text component objects;

the creating module is configured to create a cache image object with a same size as a stored text component when displaying the text component on a screen for the first time.

Further, the terminal according to the embodiment of the disclosure can further comprise a second processing module configured to render directly, on the screen, cache images corresponding to text components which are kept being displayed on the screen and deleting cache images corresponding to text components which were moved out of the screen to release memory, when a user performs a rolling operation on the screen.

What is stated above is only the preferred embodiment of the disclosure and not intended to limit the scope of protection of the disclosure, and any modifications, equivalent replacements, improvements and the like within the spirit and principle of the disclosure shall fall within the scope of protection of the disclosure.

The invention claimed is:

1. A method for implementing display cache for a webpage comprising text regions and non-text regions, comprising:

determining the text regions of the webpage by analyzing Hypertext Markup Language, HTML, of the webpage;

creating, for each of the text regions, a corresponding text component;

storing, in memory, the created text components as text component objects;

creating, for each of the stored text component objects, a corresponding cache image object with a same size as the stored text component object and displaying the created cache image object on a screen;

wherein creating for each of the stored text component objects a corresponding cache image object with a same size as the stored text component objects comprises;

creating, for each of the stored text component object, a blank image with a same size as the stored text component object, and rendering texts on the created blank image to obtain a corresponding cache image object.

2. The method according to claim 1, wherein when a user performs a rolling operation on the screen, for a text region which is kept being displayed on the screen, the method further comprises:

rendering directly, on the screen, the cache image object corresponding to the text region.

3. The method according to claim 2, wherein the text component objects each is defined with attributes of its size and cache image.

4. The method according to claim 3, wherein the attributes comprise: width and height representing the size as well as cache image.

5. The method according to claim 1, wherein when a user performs a rolling operation on the screen, for a text region which was moved out of the screen, the method further comprises:

deleting the cache image object corresponding to the text region.

6. The method according to claim 5, wherein the text component objects each is defined with attributes of its size and cache image.

7. The method according to claim 6, wherein the attributes comprise: width and height representing the size as well as cache image.

8. The method according to claim 1, wherein the stored text component objects each is defined with attributes of its size and cache image.

9. The method according to claim 8, wherein the attributes comprise: width and height representing the size as well as cache image.

10. A terminal for implementing display cache for a webpage comprising text regions and non-text regions, the terminal comprising a screen, a first processing module and a creating module, wherein the first processing module is configured to determine text regions of a webpage to be displayed by analyzing Hypertext Markup Language, HTML, of the webpage and to create a corresponding text component for each of the text regions and to store, in memory, the created text components as text component objects; and the creating module is configured to create, for each of the stored text component objects, a corresponding cache image object with a same size as the stored text component object, and to display the created cache image object on the screen, wherein the creating module is further configured to create, for each of the stored text component object, a blank image with a same size as the stored text component object, and render texts on the created blank image to obtain a corresponding cache image object.

11. The terminal according to claim 10, further comprising a second processing module, configured to render directly, on the screen, the cache image object corresponding to a text region which is kept being displayed on the screen, when a user performs a rolling operation on the screen.

12. The terminal according to claim 11, wherein the second processing module is further configured to delete the cache image object corresponding to a text region which was moved out of the screen, when the user performs the rolling operation on the screen.

13. The terminal according to claim 12, wherein the component objects each is defined with attributes of its size and cache image.

14. The terminal according to claim 13, wherein the attributes comprise: width and height representing size and cache image.

15. The terminal according to claim 11, wherein the component objects each is defined with attributes of its size and cache image.

16. The terminal according to claim 15, wherein the attributes comprise: width and height representing size and cache image.

17. The terminal according to claim 10, wherein the text component objects each is defined with attributes of its size and cache image.

18. The terminal according to claim 17, wherein the attributes comprise: width and height representing size and cache image.

* * * * *